Sept. 8, 1925. 1,552,826
D. F. COMSTOCK
COLOR CINEMATOGRAPHY
Filed Nov. 2, 1921
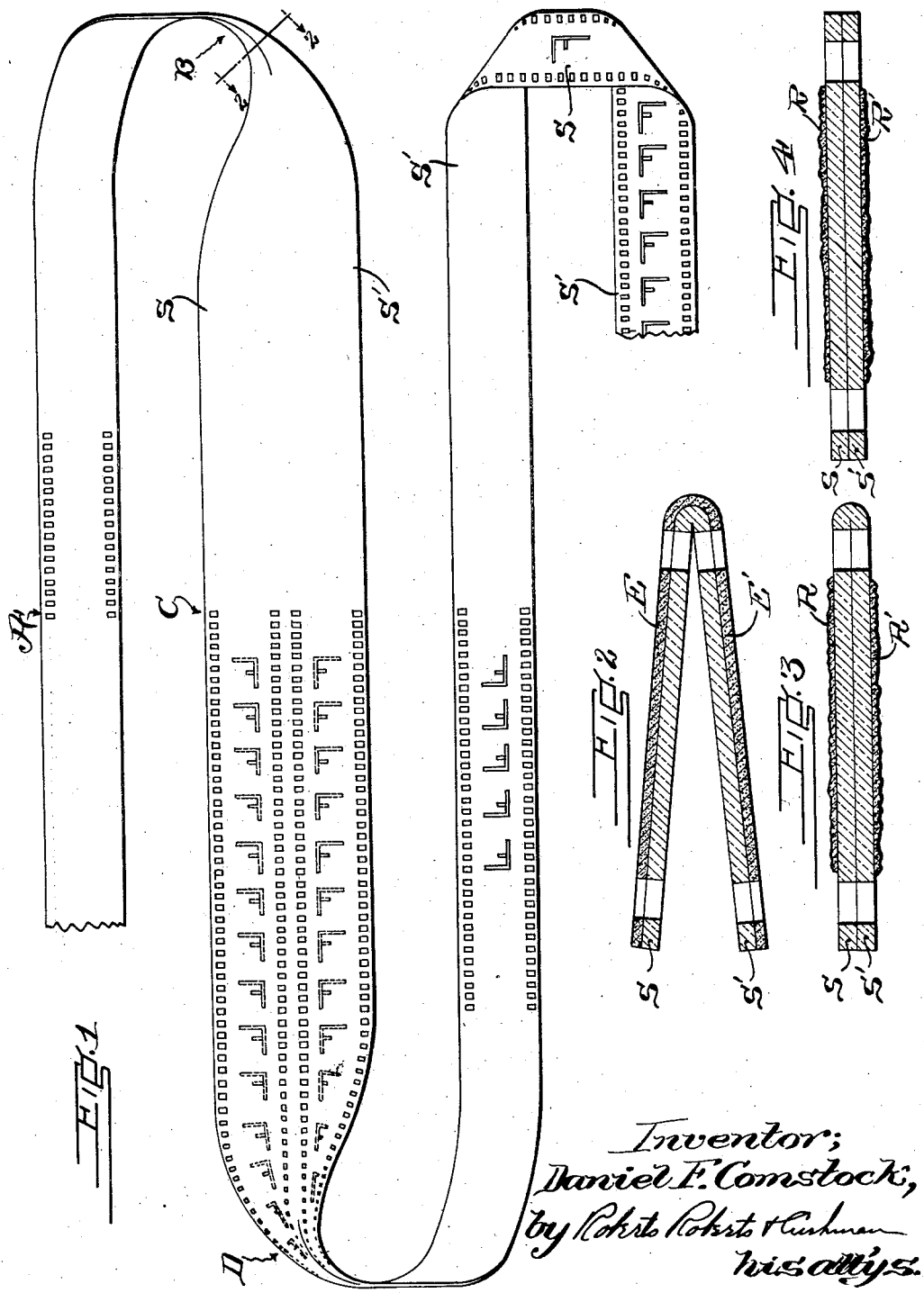

Patented Sept. 8, 1925.

1,552,826

UNITED STATES PATENT OFFICE.

DANIEL F. COMSTOCK, OF CAMBRIDGE, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

COLOR CINEMATOGRAPHY.

Application filed November 2, 1921. Serial No. 512,202.

*To all whom it may concern:*

Be it known that I, DANIEL F. COMSTOCK, a citizen of the United States of America, and resident of Cambridge, in the county of Middlesex and State of Massachusetts, have invented new and useful Improvements in Color Cinematography, of which the following is a specification.

This invention relates to the art of color photography, more particularly to the so-called subtractive branch of the art in which the complemental images representative of the two or more color aspects of the object-field are supported in superposed registry in contradistinction to the additive branch where the complemental images are separately supported and separately projected upon a screen in registry, and still more particularly to the production of color pictures by relief images, i. e., images formed in relief on a film of gelatin or other suitable material.

The production of color cinematographic films adapted for substractive projection presents peculiar difficulties not experienced in the production of still pictures. One such difficulty is to maintain a uniform balance between the color values of the complemental images throughout the length of the film. While the colors of a single pair of complemental images, differently colored to produce the desired selective absorption, can be balanced without great difficulty to produce the various hues with accuracy, it is extremely difficult to produce a series of such pairs in rapid succession and in diminutive size, with films which may vary somewhat throughout their lengths, and under operating conditions involving both variation in the light and also variation in the illumination of moving objects due to changes in their positions relatively to the light. Another difficulty is to render the images sufficiently clear and transparent to secure clear bright pictures on the screen, the following factors operating against this result.

Owing to the images being superposed the light must penetrate successive images. Coloring the images necessarily renders them less transmissive and many methods of producing the colors excessively reduces their transmissivity. And owing to the small size of the film images and the large size of the screen pictures the light which penetrates the images is spread over an area from one to two hundred times the size of the image.

In the usual methods of producing color motion picture positives the mordanting or similar processes usually render the film opaque to such a degree that substantially more light is needed by the projecting machine in order to get sufficiently brilliant pictures on the screen. As a matter of fact such pictures are more opaque to a narrow beam of light, such as is used in a projector, than they appear to be when held up in front of an illuminated ground glass. The reason for this is that the scatter caused by the material in the film deviates a considerable portion of the light from the arc so that it does not enter the projection lens; whereas in the case of ground glass, since light comes from the glass in all directions the light which is scattered away from the beam in the case of the beam is made up for by other beams which are, so to speak, scattered into the eye. In the case of color film according to the present invention, the projector beam is not appreciably deviated so that, other things being equal, a brilliant picture can be obtained on the screen with an amount of projected light not substantially different from what black-and-white pictures require. This is of particular importance since in practical operation the standard black-and-white apparatus will be expected to operate with color film.

The present invention is predicated upon the theory that a film having the usual celluloid support and having superposed images formed in clear gelatin stained or otherwise colored to function as differential screens would afford a solution of the aforesaid difficulties.

Theoretically an advantageous way of producing such a cinematographic film would be to employ a double coated film, printing a series of images representing one color aspect of the object field on one side of the film and on the other side printing a complemental series in registry with the first series, then etching off the exposed emulsion of each coating leaving the unexposed emulsions in the form of indirect reliefs of clear gelatin, and finally staining the reliefs on opposite sides of the film different colors respectively.

I have discovered, however, that while an indirect relief formed by the unexposed portion of the gelatin is in theory a reversed counterpart of the direct-relief image which would be formed if the unexposed portions of the gelatin were etched away, this is not true in the production of cinematographic films inasmuch as the emulsion inevitably varies more or less in thickness throughout the length of the film. Consequently, even though the exposed images extend to a uniform average depth in the emulsion, the indirect reliefs vary in average depth since they represent the difference between the uniform average depth of the exposed images and the variable depth of the emulsion.

Moreover, cinematographic films vary in sensitivity throughout their lengths and while this is not serious in making ordinary picture film it is very objectionable in making color positives in the form of indirect reliefs, as will be evident from the following consideration. Since the positive reliefs comprise the residue after the removal of the exposed portions of the emulsion, the reliefs will be thin where the exposed gelatin is thick and vice versa. Consequently, in printing a positive film slight variations in sensitivity throughout the length of the film produce large changes in the high-lights of the images, just where such variations are most noticeable. In the case of the internal printing method hereinafter disclosed, this disadvantage is conspicuously absent.

Objects of the present invention are to overcome the aforesaid and other difficulties pertaining to the production of color cinematographic films and to produce a single width film which can be employed in the ordinary projector, which has images formed in gelatin substantially free of silver or silver salts and which is therefore highly transparent, and which has colored complemental images accurately and uniformly balanced as to relative color values throughout the length of the film.

A more specific object of the present invention is to utilize relief images in the production of color cinematographic pictures and at the same time to avoid the aforesaid variation in average depth or thickness throughout the length of the film.

In an elemental aspect the invention involves a process analogous to splitting a double-coated film along its central plane, that is a plane parallel to and lying between the planes of the two faces, printing each emulsion from the inside, closing the divided film, and converting the exposed emulsions into direct reliefs by etching off the unexposed exterior fraction of the emulsions.

In a more advanced aspect the invention involves a process analogous to forming such a film initially opened, thereby to eliminate the step of splitting the film, as for example by making the film double width, coating one side of the film, printing one series of images through the celluloid on one width, printing the complemental series of images through the celluloid on the other width, folding and preferably cementing the two widths together, etching away the unexposed emulsions to form direct reliefs either before or after folding, and staining or coloring the two series the requisite colors.

A double-width strip has a number of unique advantages among which may be mentioned the following: Owing to the widths or strips being integrally joined together along their edges, longitudinal shrinkage or expansion thereof must be substantially identical. Consequently the film may be carried through the developing or other wet processes before the strips are cemented together without loss of registration due to unequal shrinkage; and the strips may therefore be folded face-to-face if desired. Moreover owing to the juxtaposed portions of the respective widths being manufactured at the same time and under the same conditions they are substantially identical in thickness, composition, etc., so that they tend to shrink and expand equally. If both widths of the film are coated at the same time, as they preferably are, the emulsion on juxtaposed portions of the respective widths is substantially identical in sensitivity thereby eliminating the variations in color balance between the complemental images on the respective widths which ordinarily results from variations in sensitivity of film stock. Thus while the sensitivity of the emulsion of the double-width film may vary throughout the length of the film, the sensitivity of both widths will vary together, the result being merely a variation in the total density of the superposed images without any relative variation which would unbalance the color ratio.

As above intimated, if the component films are joined back-to-back the latent images may be converted into reliefs either before or after the component films have been secured together. If the reliefs are formed after the films have been permanently secured together the respective series may be differently colored by first staining one side with one dye and subsequently staining the other side with another dye. If the films are joined together face-to-face the reliefs are protected in the subsequent use of the product, but a more substantial and permanent union can be effected by joining the films back-to-back with a celluloid solvent which practically welds the celluloid backs together in the form of a single integral film.

A suitable method of converting the latent images into reliefs consists in developing the images with a developer such as pyro which hardens the gelatin in the imediate neighborhood of the developed silver grains leaving the unexposed emulsion soft, bleaching the silver back to the form of silver salt with potassium ferricyanide, and fixing out the silver salts with ordinary hypo, and etching off the soft gelatin with hot water.

In order to illustrate the application of the invention I have shown, more or less diagrammatically, one concrete embodiment thereof in the accompanying drawings, in which,—

Fig. 1 is a perspective view of a length of film showing one order of procedure;

Fig. 2 is a cross-section of the film, partly open; before the reliefs are formed;

Fig. 3 is a cross-section of the film after being closed and after the reliefs have been formed; and Fig. 4 is a similar view of a slightly different form of the finished film.

The particular embodiment of the invention chosen for illustration comprises a double-width strip of celluloid S—S' coated with a sensitive emulsion E—E' and folded along its longitudinal center with the emulsion on the outside. The film is perforated as indicated at A before being printed (or otherwise exposed) and the perforations are preferably made while the two parts of the film are closed together. After being perforated the film is opened as represented at B and printed from the inside as indicated at C, the complemental images being symmetrically positioned relatively to the folding line so that when the film is again closed the images register. By perforating the film before it is opened the perforations are symmetrically positioned relative to the folding line and therefore register when the film is again closed. Consequently the complemental images may be symmetrically positioned and accurately registered by locating the series of images on one width relative to the perforations in that width and locating the series of images on the other width with reference to the perforations therein.

The complemental images may be formed on the respective strips S and S' in various ways but they are preferably formed by a process of printing from a single negative having series of complemental negatives, the complemental negatives of the respective series being exposed simultaneously from the same point of view (as described for example in my prior application Serial No. 77,237 filed Feb. 9, 1916) so that the complemental images will be exactly geometrically similar and therefore accurately registrable when the strips are joined together. Any suitable mechanism for accurately positioning and registering the images may be employed in forming either the negatives or the positives or both.

The several series of images may be printed concomitantly in a single operation or successively in separate operations. If the negative film from which the positives are printed is in the form of a double-width film having the complemental images reversed transversely of the film as disclosed in said application, Serial No. 77,237, or in the form of two separate strips having one series on one strip and the complemental series on the second strip in reverse position transversely of the film, both series are preferably printed simultaneously. In printing from a single-width negative having the images of the two series alternating, one series may be printed on one width of the positive in one operation and the other series printed upon the other width in a succeeding operation.

After the strips have been printed from the inside they are again folded together as indicated at D and preferably cemented.

The ingredient or composition employed to unite the component strips back-to-back should meet several requirements. It should unite the strips so that they will not separate in use or under unfavorable atmospheric conditions and so that the resultant film is substantially transparent. It should be adapted to effect a quick joinder of the strips and to permit a speedy dyeing of the resultant film.

Methyl alcohol meets all of these conditions, although other ingredients or compositions may be employed. Methyl alcohol does not merely glue or cement the strips together but inasmuch as it is a solvent of celluloid the strips may be homogeneously united or fused together by wetting their backs with the alcohol sufficiently to soften the surfaces and then pressing the strips together back-to-back. Owing to the fact that methyl alcohol is miscible with water, the alcohol trapped between the strips when they are pressed together may escape through the strips and thence through the gelatin coatings even when the latter are wet.

To make the film lie flat after being folded and to make it more flexible at the folded edge and to make it refold along the same line, the folded edge may be moistened with a celluloid solvent such as methyl alcohol, thereby to permit the film to fold more sharply; or it may be rubbed with a pad saturated with a solvent not only to moisten the fold but also to reduce the thickness at the fold. This is preferably done after the film has been folded and before it is perforated or at least before it is printed or otherwise exposed.

Instead of the treatment mentioned in the preceding paragraph or in addition to this treatment the folded edge of the film may be trimmed off after the widths have been secured together. If desired the film may be made sufficiently wider to permit the aforesaid trimming and at the same time to leave the distance between the sprocket holes and the edges of the film the same on both sides. When so trimmed the finished film appears as shown in Fig. 4.

The images may be developed before or after the strips are folded together but when the images are on the outside they are preferably developed after folding. After being developed the images are etched to convert them into reliefs and subsequently stained. The relative positions of the complemental images on the opposite sides of the film is indicated in the lower part of Fig. 1.

If the strips are integrally connected at their edges and folded together the finished film appears in section as shown in Fig. 3 where R and R' represent the complemental relief images; if the component strips are separate and joined together by apparatus such as shown in application Ser. No. 500,842, filed September 15, 1921, both sides of the film appear like the left-hand side of Fig. 3, i. e., as shown in Fig. 4.

From the foregoing it will be evident that the new positive film strip has the following characteristics. Each picture on it consists of a pair of homogeneous colloid reliefs, free from silver granules or other light-occluding non-transparent or translucent bodies, and respectively uniformly and complementarily colored by transparent staining or dyeing, to constitute a screen capable of absorbing light not of its own color proportionally to its thickness.

Where these reliefs mutually are negligibly thin, white light incident upon them is transmitted unchanged. Where the one is thick and the other thin, the pure color of the thicker is transmitted. Where both are of effective thickness, the light is obstructed according to the successive absorption by each member of the pair of its complemental fractions; but in practice, totally black objects being infrequent rarities, even the shadows have color in them, varying according to the variations in thickness of the relief from a neutral or balanced mixture tone to the tone of one or the other complementary color of the respective member of the pair of complemental reliefs.

An important advantage of the present invention is due to the fact that the holding of the coloring dyes is in the nature of a mechanical process. Where chemical mordants are used for dyes the chemical properties of the dyes come into consideration and form a limiting condition to the number of dyes and combination of dyes which can be successfully used. In the case of those processes depending upon the fact that hard gelatin and soft gelatin have different action on certain dyes this limiting condition is even more pronounced since extremely few known dyes of the right colors can be found which thus distinguish between hard and soft gelatin. In the present process any dyes may be used which will be absorbed by gelatin, inasmuch as all that is necessary is that the geometrical volume of the relief be filled with dye. A very wide range of dyes is therefore possible of use and by combining various dyes and various properties the most delicate changes in color may be produced.

In forming the relief images the marginal portions of the gelatine or other colloid material are completely removed in the hot-water etching bath, the marginal portions being unexposed. Thus the gelatine or other colloid material in which the images are formed terminates short of the marginal edges of the film and indeed is confined to the space between the series of marginal registering openings (Figs. 3 and 4). This is important in coloring the relief images inasmuch as pigment solution can be applied to one side with little or no tendency to creep around the edges of the film to the opposite side by virtue of the bare celluloid margins. Even if the solution does creep over the edges, the shoulders formed by the edges of the relief images serve as dams against spread over the images.

Obviously the advantage of bare margins is not confined to relief-image films, nor to double-coated films, nor the process of coloring films, but applies to any film where one side is to be liquid treated without wetting the other side. Indeed there are mechanical advantages in having the film bare along the margins and around the sprocket holes which are independent of any liquid treatment.

While I have described the invention with reference to a two-color process for the sake of simplicity, it will be evident that it may be utilized in three (or more) color work, as for example by using a triple, quadruple, etc., width film, by superposing three or more separate films, etc.

The term "complemental images" is herein used to designate images representative of different color aspects of an object field which, when combined by projection or otherwise, will yield a more or less accurate color reproduction of the object field, the colors which the images represent not necessarily being exactly complementary.

I claim:

1. A positive film strip for cinematographic display comprising an image support having parallel bounding surfaces and carrying wholly exterior thereto a series of color-absorption pictures each consisting of a superposed pair of homogenous transparent reliefs of a colloid substance free from opaque or merely translucent light-obstructing bodies, said reliefs respectively varying locally in thickness inversely in respect to the total illumination of the image pictured, and each varying in thickness directly in accordance respectively with the distribution of one predominant complementary color of the image pictured, the respective reliefs being uniformly homogeneously and transparently colored to each absorb light of the color transmitted by the other relief of the pair.

2. A cinematographic film comprising a plurality of series of superposed direct-relief images representing different color aspects of an object field from the same point of view at the same time and mounted on an image support to whose bounding surfaces said images are wholly exterior.

3. A cinematographic film comprising an image support having a plurality of series of complemental direct-relief images carried thereon in superposed back-to-back relationship.

4. A cinematographic film comprising an image support having a plurality of series of complemental direct-relief images supported on opposite sides thereof in superposed relationship and with corresponding sides oppositely directed.

5. A cinematograhpic film comprising an integral image strip having a plurality of series of complemental direct-relief images supported solely thereby and on opposite sides thereof, the complemental images of the respective series representing concomitant aspects of the object field from the same point of view and being in accurate registry with each other.

6. A photographic record comprising an image support formed of two separate layers integrally joined together, said support carrying complemental direct-relief images on opposite sides thereof in superposed relationship.

7. A cinematographic film comprising two image strips respectively bearing relief images complemental to each other, said strips being joined together back-to-back to form an integral film with the complemental images in registered superposition.

8. A cinematographic film comprising two image strips respectively bearing images complemental to each other, said strips being joined together back-to-back to form an integral film with the complemental images in registered superposition.

9. A cinematographic film comprising two celluloid strips bearing successive sets of images complemental to each other, said strips being fused together back-to-back to form an integral film with the complemental images in registered superposition.

10. A cinematographic film comprising a central strip of celluloid, layers of gelatin on opposite sides of said strip having series of complemental relief images therein, at least one of said layers being substantially free of silver and silver salt and having a substantially uniform average thickness.

11. A cinematographic film comprising an integral strip of celluloid having on opposite sides thereof series of registered relief images of colored gelatin, each series being of uniform average depth throughout the entire length thereof.

12. A cinematographic film having complemental series of relief images in superposed registry, the respective series being differently colored, and each series having substantially uniform average depth throughout the length thereof.

13. A cinematographic film comprising an integral strip of celluloid having on opposite sides thereof superposed complemental direct relief images in transparent gelatin, the gelatin constituting the images on one side being stained to form color screens corresponding to the color aspect represented by the images on that side, and the gelatin constituting the images on the other side being stained to form color screens corresponding to the color aspect represented by the images on that side.

14. A cinematographic film comprising a multi-width strip having series of complemental relief images on the respective widths thereof, the widths being folded and cemented together with the complemental images in registry.

15. A cinematographic film comprising a multi-width strip having series of complemental direct-relief images on the respective widths thereof, the widths being folded together with the complemental images in registry.

16. The method of forming a cinematographic film which comprises forming on the respective widths of a multiple-width film series of complemental images, with the images of each complemental set in alignment transversely of the film, and subsequently folding the widths together with the complemental images in registry.

17. The method of forming a cinematographic film which comprises perforating each width of a multi-width strip so that the perforations register when the widths are folded together, exposing the widths with series of complemental images respectively with the images of each complemental set in alignment transversely of the film, and subsequently folding the widths together with the complemental images in registry.

18. The method of forming a color cinematographic film which comprises exposing the respective widths of a multi-width strip through the back to form complemental latent images next to the backs, and folding the widths together with the complemental images in registry, the latent images being converted into reliefs and stained different colors.

19. The method of forming a color cinematographic film which comprises folding a multi-width film longitudinally, perforating the folded widths simultaneously, unfolding the widths, printing the respective widths through their backs to form complemental images next to the backs in corresponding positions relative to their respective perforations, and refolding the widths together with the complemental images in registry, the complemental reliefs being converted into reliefs and stained different colors.

20. The method of forming a color cinematographic film which comprises folding a multi-width film longitudinally, perforating the folded widths simultaneously, unfolding the widths and exposing same with complemental series of images, and refolding the widths with the complemental images in registry.

21. The method of forming a cinematographic film which comprises superposing different components of film and perforating same simultaneously, removing the strips from superposed relationship, forming complemental series of images on the strips respectively and again superposing the strips with the complemental images in registry.

22. The method of forming a cinematographic film which comprises forming on different strips respectively series of direct-relief images complemental to each other, and then securing the strips together with the complemental images in superposed registry and with corresponding surfaces of said reliefs toward each other.

23. The method of forming a cinematographic film which comprises forming a plurality of series of direct-relief images on image supports adapted to be fused together by a solvent, and then fusing the supports together back-to-back with the images in superposition by wetting the backs of the supports with the solvent and pressing the supports together.

24. The method of forming a color cinematographic film which comprises forming on different widths of film series of direct-relief images complemental to each other and forming therewith a single width film having complemental images in registry and with corresponding sides of said reliefs toward each other.

25. The method of forming a color cinematographic film which comprises forming on different strips of film series of complemental relief images having uniform average thickness and forming therewith a single width film having complemental images in registry and with corresponding sides of said reliefs toward each other.

26. The method of forming a cinematographic film which comprises forming a plurality of series of direct-relief images in gelatin on separate widths of celluloid film respectively, wetting the backs of the celluloid widths with a solvent miscible with water, and pressing the films together back-to-back with the images in superposition.

Signed by me at Boston, Massachusetts, this 14th day of September, 1921.

DANIEL F. COMSTOCK.